Patented May 4, 1943

2,318,429

UNITED STATES PATENT OFFICE 2,318,429

AQUEOUS DISPERSION OF POLYMERIZED ALKYL METHACRYLATE AND METHOD OF PREPARING SAME

Joseph Edward Smith, Wilmington, Del., assignor to E. I. du Pont de Nemours & Company, Wilmington, Del., a corporation of Delaware No Drawing. Application August 3, 1940, Serial No. 351,082

13 Claims. (Cl. 260—32)

This invention relates to the preparation of stable dispersions of polymeric resins and more particularly to the preparation of stable dispersions of polymeric resins from esters of methacrylic acid using a partially saponified polyvinyl acetate as dispersing agent.

This invention has as an object the preparation of dispersions of resins. A further object is the preparation of stable dispersions of polymeric resins from esters of methacrylic acid using a partially saponified polyvinyl acetate as dispersing agent. A further object is the preparation of stable dispersions comprising a polymerized methacrylic acid ester or mixtures of methacrylic acid esters and a partially saponified polyvinyl acetate of saponification number between approximately 40 and 130 and a viscosity of 10 to 30 centipoises at 20° C. for a 4% aqueous solution. A further object is the preparation of stable dispersions comprising a polymerized methacrylic acid ester, plasticizer, and a partially saponified polyvinyl acetate of saponification number between approximately 40 and 130 and a viscosity of approximately 20 centipoises at 20° C. for a 4% aqueous solution.

These objects are accomplished by the following invention. A solution in water of partially saponified polyvinyl acetate of saponification number between approximately 40 and 130 and a viscosity of 10 to 30 centipoises at 20° C. for a 4% aqueous solution is agitated vigorously with a monomeric ester of methacrylic acid containing a small amount of benzoyl peroxide. The emulsion obtained is heated to produce polymerization of the methacrylic acid ester. The resulting dispersion of a polymerized methacrylic acid ester is stable and is compatible with a wide variety of textile finishing agents.

Aqueous dispersions of polymeric esters of methacrylic acid are of great importance as sizing materials for textiles. It is desirable that the dispersions be free of organic solvents in order to avoid hazard to health during use in the trade. It is necessary that the concentrated dispersions remain stable for a sufficient period of time to permit satisfactory handling and marketing.

It is known that solvent-free dispersions can be prepared by emulsifying the monomers of liquid polymerizable materials in water and then polymerizing under selected conditions to obtain an aqueous dispersion of the polymer. Anionic surface active emulsifying agents, such as the fatty alcohol sulfates and alkyl naphthalene sulfonic acid salts, as well as protective colloids, such as gelatin, starches and natural gums, may be used as emulsifying and dispersing agents in a process of this type.

Aqueous dispersions that have been obtained with surface active agents are of limited utility; for example, dispersions prepared with an anionic surface active agent, for example, an alkylated naphthalene sulfonic acid salt or a fatty alcohol sulfate, are readily coagulated by cationic surface active agents, by polyvalent metal ions, and by positively charged emulsions and dispersions. Since these latter materials are widely used as components of textile finishes, it is obvious that dispersions incompatible with them are of limited utility. Aqueous dispersions of polymeric methacrylic acid esters prepared with gelatin, starches and natural gums are of relatively poor stability.

It is frequently desirable to use resin dispersions with positively charged wax dispersions designed to produce water-repellent effects on textile fabrics. Resin dispersions containing surface active agents are obviously unsuited for this purpose, since the presence of a surface active agent lowers the repellency markedly.

Resin dispersions prepared by the methods described herein can be used satisfactorily in the treatment of textiles in processing with either anionic or cationic surface active agents. These resin dispersions can also be applied to textiles in the presence of metallic salts of multivalent metal ions, as well as with either positively or negatively charged emulsions or dispersions. The resin dispersions prepared by the processes described in this invention are believed to be weakly negative in charge. As a result, they are entirely compatible with anionic surface active agents and with negatively charged emulsions. These weakly charged resin dispersions may, under certain conditions, coagulate positively charged emulsions or dispersions if mixed directly with them. However, if an aluminum salt, as for example, aluminum acetate, is first mixed with the resin dispersion it (the dispersion) is entirely compatible with positively charged emulsions and with cationic surface active materials. It is obvious from these facts that the resin dispersions described herein have a wide utility in the trade, since they can readily be adapted for use with both anionic and cationic surface active agents, with both positively charged and negatively charged emulsions or dispersions, and are stable in the presence of heavy metal salts. The dispersions have the added advantage that they can be applied to textiles at any pH likely to be encountered in processing, i. e. a pH range of approximately 3 to 10.

Polyvinyl alcohol derivatives are known to have emulsifying properties in a number of colloidal systems. It has been found in the present invention that a number of polyvinyl alcohol derivatives are suitable for emulsifying monomeric methacrylic acid esters in water. However, the emulsions are in many instances unstable following polymerization of the emulsified monomer, especially if heat is employed to accelerate the polymerization. It has been discovered in this invention that a selected group of partially saponified polyvinyl acetate derivatives are suitable for maintaining stable, aqueous dispersions of polymeric methacrylic acid esters following the transition from emulsified monomer to polymer at elevated temperatures. The dispersions of the polymer are sufficiently stable for commercial distribution and use.

In carrying out the invention an aqueous solution of partially saponified polyvinyl acetate is agitated vigorously with a monomeric methacrylic acid ester containing a small amount of benzoyl peroxide. An emulsion is obtained. The emulsion is heated to a temperature above approximately 60° C. to induce polymerization of the emulsified monomer. The benzoyl peroxide acts as an oxidation catalyst to promote polymerization. It has been found in this invention that a partially saponified polyvinyl acetate derivative of saponification number between approximately 40 and 130 and which has a viscosity of approximately 20 c. p. for a 4% aqueous solution at 20° C. is satisfactory for use in this process. The concentration of partially saponified polyvinyl acetate in the dispersion should be at least 0.75% and should not be more than 5% owing to the viscosity of the solution. The resin dispersions produced under these selected conditions are stable for a period of months and can be satisfactorily marketed.

In preparing dispersions of the type described above, it is advantageous to use a surface active agent to assist in preparing the aqueous solution of the polyvinyl alcohol derivative. Polyvinyl alcohol derivatives are highly soluble in water but are difficult to dissolve rapidly since the material tends to form lumps covered with a gelatinous coating that retards the rate of penetration through the mass. The use of about 1% of a surface active agent, as technical dodecyl diethylcyclohexylamine sulfate, on the weight of the polyvinyl alcohol derivative in the water, makes it possible to dissolve the material quite rapidly at a temperature of approximately 160° F. The addition of the surface active agent to this extent in the emulsions prepared with the polyvinyl alcohol derivative has no detrimental effect on their stability.

The following examples illustrate but do not limit the invention. All parts are given by weight except where it may be otherwise indicated.

EXAMPLE 1

A series of aqueous emulsions of methyl methacrylate was prepared using a variety of partially saponified polyvinyl acetates as emulsifying agents. The emulsions were of varying stability depending on the saponification number of the polyvinyl alcohol derivative and its viscosity in solution. The following procedure was used:

15.15 parts of methyl methacrylate monomer containing 0.15 part of benzoyl peroxide were mixed with 1.5 parts of a saponified polyvinyl acetate derivative in 83.35 parts of water by means of a high-speed stirrer. The emulsion was heated for 4 hours at 67° C.; the dispersed phase was converted into a resinous polymer. The stability of the dispersions obtained on heating varied markedly, as is shown by the data contained in the following Table 1.

Table 1

| Emulsifier | Saponification No. of emulsifier | Viscosity at 20° C. for a 4% aqueous solution of emulsifier (C. p.) | Stability of aged dispersion |
| --- | --- | --- | --- |
| 1. Partially saponified polyvinyl acetate. | 20 | 20 | Dispersion broke on aging. |
| 2. Do | 40 | 20 | Excellent. |
| 3. Do | 80 | 20 | Do. |
| 4. Do | 109 | 20 | Do. |
| 5. Do | 128 | 20 | Do. |
| 6. Do | 135 | 20 | Dispersion broke on aging. |
| 7. Do | 245 | 20 | Do. |
| 8. Do | 80 | 40 | Do. |
| 9. Do | 180 | 40 | Do. |
| 10. Completely saponified polyvinyl acetate. | 0–10 | 5 | Do. |
| 11. Do | 0–10 | 20 | Do. |
| 12. Do | 0–10 | 55 | Do. |

EXAMPLE 2

A series of emulsions was prepared as in Example 1 with the following variation in procedure:

15.15 parts of methyl methacrylate monomer containing 0.15 part of benzoyl peroxide were mixed with 1.5 parts of partially saponified polyvinyl acetate and 0.015 part of technical dodecyl diethylcyclohexylamine sulfate in 83.335 parts of water by means of a high-speed stirrer. The emulsions were aged at 67° C. as in Example 1. The stability of the dispersions obtained was the same as in Example 1.

EXAMPLE 3

A series of emulsions was prepared as in Example 1 with the following variation in procedure:

30.30 parts of n-butyl methacrylate monomer containing 0.30 part of benzoyl peroxide were mixed with 2.25 parts of a saponified polyvinyl acetate derivative and 0.023 part of technical dodecyl diethylcyclohexylamine sulfate in 64.427 parts of water by means of a high-speed stirrer. The emulsions were aged at 67° C. as in Example 1. The stability of the dispersions obtained on heating varied markedly as is shown by the data contained in the following table:

Table 2

| Emulsifier | Saponification No. of emulsifier | Viscosity at 20° C. for a 4% aqueous solution of emulsifier | Stability of aged dispersion |
| --- | --- | --- | --- |
| 1. Partially saponified polyvinyl acetate. | 50 | 20 | Excellent. |
| 2. Do | 108 | 20 | Do. |
| 3. Do | 125 | 20 | Do. |
| 4. Do | 135 | 20 | Dispersion was unstable. |
| 5. Do | 245 | 20 | Do. |
| 6. Do | 80 | 40 | Do. |
| 7. Completely saponified polyvinyl acetate. | 0–10 | 5 | Do. |
| 8. Do | 0–10 | 20 | Do. |
| 9. Do | 0–10 | 55 | Do. |

Example 4

A series of emulsions were prepared as in Example 1 with the following variation in procedure:

30.30 parts of iso-butyl methacrylate monomer containing 0.30 part of benzyl peroxide were mixed with 2.25 parts of a partially saponified polyvinyl acetate and 0.023 part of technical dodecyl diethylcyclohexylamine sulfate in 67.427 parts of water by means of a high speed stirrer. The emulsions were aged at 67° C. as in Example 1. Table 3 shows the variation in the stability of the different aged emulsions.

Table 3

| Emulsifier | Saponification No. of emulsifier | Viscosity at 20° C. for a 4% aqueous solution of emulsifier | Stability of aged dispersion |
|---|---|---|---|
| | | C. p. | |
| 1. Partially saponified polyvinyl acetate | 30 | 20 | Dispersion was unstable. |
| 2. Do | 40 | 20 | Excellent. |
| 3. Do | 80 | 20 | Do. |
| 4. Do | 108 | 20 | Do. |
| 5. Do | 125 | 20 | Do. |
| 6. Do | 135 | 20 | Dispersion was unstable. |
| 7. Do | 80 | 40 | Do. |
| 8. Do | 110 | 40 | Do. |
| 9. Completely saponified polyvinyl acetate | 0–10 | 5 | Do. |
| 10. Do | 0–10 | 20 | Do. |
| 11. Do | 0–10 | 55 | Do. |

Example 5

The minimum concentration of a saponified polyvinyl acetate derivative required to prepare an aqueous dispersion of methyl methacrylate is about 0.75% on the weight of the dispersion as is shown by the following data:

10 parts of methyl methacrylate monomer containing 0.1 part of benzoyl peroxide were mixed with 89.9 parts of an aqueous solution containing a partially saponified polyvinyl acetate of saponification number 108, viscosity of 4% aqueous solution, 20 c. p. at 20° C., and a small proportion of technical dodecyl diethylcyclohexylamine sulfate by means of a high speed stirrer. The emulsion was heated to 67° C. for 4 hours to convert the dispersed phase into a resin polymer. The effect of varying concentrations of the polyvinyl alcohol derivative on the stability of the resultant aqueous dispersion is described in the following Table 4.

Table 4

| Concentration of PVA in dispersion | Concentration of technical dodecyl diethylcyclohexylamine sulfate in dispersion | Stability of dispersion |
|---|---|---|
| | Per cent | |
| 0.5% | 0.005 | Poor. |
| 0.75% | 0.0075 | Good. |
| 1.0% | 0.01 | Excellent. |
| 3.0% | 0.03 | Do. |
| 4.5% | 0.045 | Do. |

Example 6

Dispersions of methacrylate derivatives prepared as described above are applicable to textiles under widely varying conditions of pH.

An aqueous dispersion of n-butyl methacrylate polymer prepared with a saponified polyvinyl acetate derivative of saponification number 108 (see Example 3, No. 2) was applied to cotton broadcloth as follows: (a) 5 parts of the resin dispersion were diluted with 95 parts of water containing 0.25 part of acetic acid. A strip of cotton broadcloth was passed through the dispersion at 100° F. and run between squeeze rolls to obtain a 100% increase in weight. The impregnated cloth was air dried at 240° F. to obtain a sized fabric with a full, stiff hand. The dispersion was entirely stable during application. The pH of the bath was 3.8. (b) 5 parts of the resin dispersion diluted with 95 parts of water was applied to cotton broadcloth as in (a). Similar results were obtained. The pH of the bath was 6.0. The bath was entirely stable. (c) 5 parts of the resin dispersion diluted with 95 parts of water containing 1 part of 28% aqueous ammonia was applied to cotton broadcloth as in (a). Similar results were obtained. The pH of the bath was 9.5. The bath was entirely stable during application.

Example 7

The dispersions of the methacrylate derivatives described above also were stable in application to textiles in the presence of multivalent metal salts. (a) 5 parts of the resin dispersion from Example 3, No. 3 were diluted with 95 parts of water containing 5 parts of Epsom salt. Cotton broadcloth was treated in the bath and dried as in Example 6a. The bath was entirely stable during application. The sized fabric was of excellent fullness and firmness. (b) 5 parts of the resin dispersion from Example 3, No. 3 were diluted with 95 parts of water containing 2 parts of aluminum triacetate. A strip of cotton broadcloth was treated in the bath and dried as in Example 6a. A sized fabric with improved water repellency was obtained. The emulsion was entirely stable during application.

Example 8

The dispersions of the methacrylate derivatives described above may be applied in combination with cationic surface active agents for finishing textiles. For example, 1 part of the resin dispersion from Example 3, No. 3 was diluted with 99 parts of water containing 0.1 part of stearyl trimethyl ammonium bromide. A strip of viscose process rayon crepe fabric was passed through the dispersion and between squeeze rolls to obtain a 100% increase in weight. The fabric was air dried on a frame at 240° F. The finish on the fabric was characterized by fullness, firmness and considerable surface lubrication. The dispersion was entirely stable during application.

Example 9

The dispersions of the methacrylate derivatives described above may be applied in combination with anionic surface active agents for finishing textiles. For example, 1 part of the resin dispersion from Example 2, No. 4 was diluted with 99 parts of water containing 0.1 part of commercial cetyl sodium sulfate. A strip of viscose process rayon crepe fabric was treated by the method of Example 8. The dispersion was entirely stable during application. The finish on the fabric was characterized by fullness and softness.

Example 10

The dispersions of the methacrylate derivatives described above may be applied in combination with positively charged aqueous dispersions to textiles. For example, an aqueous resin dispersion prepared as in Example 3, No. 3 may be applied simultaneously with Composition A, which comprises the following components.

Composition A:

| | Per cent |
|---|---|
| Refined paraffin wax | 16.7 |
| Acetate of deacetylated chitin | 1.3 |
| Basic aluminum acetate | 3.0 |
| Acetic acid | 0.5 |
| Technical dodecyl diethylcyclohexylamine sulfate | 0.09 |
| Water | 78.41 |

2.5 parts of the resin dispersion from Example 3, No. 3 were mixed with 2.5 parts of Composition A and the mixture was diluted with 95 parts of water. A strip of cotton broadcloth was passed through the dispersion at 100° F. and run between squeeze rolls to obtain a 100% increase in weight. The fabric was dried on a mangle heated to 250° F. A sized fabric was obtained which was characterized by softness, fullness and excellent water repellency. The water repellent effect obtained was more durable to laundering than that obtained from the application of Composition A alone. The dispersion was entirely stable during application.

EXAMPLE 11

2 parts of the dispersion prepared in Example 3, Table 2, No. 2, were dispersed in 97.5 parts of water with 0.5 part of an aqueous emulsion of a mineral oil of the following composition:

| | Parts |
|---|---|
| A mineral oil of 300–310 S. U. V. at 100° F. | 20 |
| Technical octadecyl diethylcyclohexylamine sulfate | 14.4 |
| Technical octadecenyl alcohol | 2.0 |
| Triethylene glycol | 4.0 |
| n-Butanol | 2.0 |
| Water | 57.6 |

A strip of cotton broadcloth was passed through the liquid at 100° F. and run between padded squeeze rolls to obtain a 100% increase in weight. The fabric was dried in an oven at 240° F. A sized fabric was obtained which was characterized by fullness, firmness and considerable surface lubrication. The dispersion was entirely stable during application.

Interpolymers of the methacrylate ester derivatives can be prepared by the same process used for the preparation of dispersions of the individual methacrylate ester polymers. The same limits apply to the saponification number and viscosity in solution of the polyvinyl alcohol derivatives satisfactory for preparing methacrylate polymer and interpolymer dispersions. Plasticizers for the methacrylate derivatives may be included in the compositions without impairing the effectiveness of the polyvinyl alcohol derivative as emulsifying agent. Suitable plasticizers are discussed by Strain, Kennelly, and Dittmar in Ind. and Eng. Chem., 31, 382, (1939).

The commercial dodecyl diethylcyclohexylamine sulfate used as wetting agent for assisting in dissolving the polyvinyl alcohol derivative may be substituted by any other wetting agent which has pronounced surface active properties in aqueous solution.

Compositions described herein are useful as sizing agents for textiles to produce durable finishes characterized by fullness. The finishes are resistant to laundering and discoloration by light and heat. Finishes prepared with methyl methacrylate are good delusterants. The dispersions may be used alone or as binders for fillers as starch, dextrin, talc, clay, gums, etc. The materials may be used with cationic and anionic softeners and with cationic and anionic emulsions and dispersions.

The advantages of the invention are as follows:

(a) Stable, solvent free dispersions of methacrylate resins can be prepared which are compatible with a wide variety of both anionic and cationic surface active agents and finishing agents as well as with both positively and negatively charged emulsions and dispersions. The dispersions are much more widely applicable than those prepared using surface active agents for the emulsification since these latter dispersions are compatible only with similarly charged surface active agents, emulsions or dispersions. The dispersions are applicable, not only to cotton and viscose process rayon as shown in the examples, but also to textiles in general manufactured from wool, silk, nylon, vinyon, cotton, linen, regenerated cellulose and cellulose esters and ethers.

(b) These methacrylate resin dispersions are compatible with a wide number of water soluble multivalent and heavy metal salts which may be present in textile processing as for example water soluble salts of calcium, magnesium, barium, aluminum, tin, lead, cobalt, nickel, iron, chromium, and manganese. Dispersions prepared with anionic surface active agents may be coagulated by the presence of these metal ions.

(c) These methacrylate resin dispersions applied with wax water repellent compositions produce a water repellent finish on textiles which is more resistant to laundering than is the effect from the wax composition alone.

The subjoined claims are intended to cover not only the products described herein but also to generically cover the dispersions of methacrylate resins which are described and specifically claimed in my copending applications, Serial Numbers 351,083, 351,084, 351,085, 351,086, 351,087, and 351,088 filed on this same day. The dispersions of methacrylate resins described and claimed in these other applications contain additional ingredients which are not mentioned in the subjoined claims. These additional ingredients serve to modify the properties of these resin dispersions as well as to effect the type of finish which these resin dispersions impart to fabrics. References may be made to these copending applications for a further disclosure of certain modified dispersions which are generically covered by the subjoined claims.

The above description and examples are intended to be illustrative only and not to limit the scope of the invention. Any departure therefrom which conforms to the spirit of the invention is intended to be included within the scope of the appended claims.

I claim:

1. A process of forming a stable aqueous dispersion of a polymerized alkyl methacrylate which comprises emulsifying the ester monomer in an aqueous solution of a partially saponified polyvinyl acetate having a saponification number of 40 to 130 and a viscosity in a 4% aqueous solution at 20° C. of 10 to 30 centipoises and effecting polymerization of the monomer sufficient of the partially saponified polyvinyl acetate being employed to maintain the polymerized alkyl methacrylate in suspension, the amount employed being not less than 0.75% of the weight of the dispersion.

2. A process of forming a stable aqueous dispersion of a polymerized alkyl methacrylate which is stable in the presence of either anionic or cationic surface active agents which comprises emulsifying the ester monomer containing a small amount of benzoyl peroxide with an aqueous solution of a partially saponified polyvinyl acetate, having a saponification number of 40 to 130 and a viscosity in a 4% aqueous solution at 20° C. of 10 to 30 centipoises and effecting polymerization of the monomer sufficient of the partially saponified polyvinyl acetate being employed to maintain the polymerized alkyl methacrylate in suspension, the amount employed being not less than 0.75% of the weight of the dispersion.

3. A process of forming a stable aqueous dispersion of a polymerized alkyl methacrylate which is stable in the presence of either anionic or cationic surface active agents which comprises emulsifying the ester monomer containing a small amount of benzoyl peroxide with an aqueous solution of a partially saponified polyvinyl acetate, having a saponification number of 40 to 130 and a viscosity in a 4% aqueous solution at 20° C. of 10 to 30 centipoises and effecting polymerization of the monomer sufficient of the partially saponified polyvinyl acetate being employed to maintain the polymerized alkyl methacrylate in suspension, the amount employed being not less than 0.75% of the weight of the dispersion.

4. A process of forming a stable aqueous dispersion of a polymerized methyl methacrylate which is stable in the presence of either anionic or cationic surface active agents which comprises emulsifying the ester monomer containing a small amount of benzoyl peroxide with an aqueous solution of a partially saponified polyvinyl acetate, having a saponification number of 40 to 130 and a viscosity in a 4% aqueous solution at 20° C. of approximately 20 centipoises and effecting polymerization of the monomer sufficient of the partially saponified polyvinyl acetate being employed to maintain the polymerized methyl methacrylate in suspension, the amount employed being not less than 0.75% of the weight of the dispersion.

5. A process of forming a stable aqueous dispersion of a polymerized butyl methacrylate which is stable in the presence of either anionic or cationic surface active agents which comprises emulsifying the ester monomer containing a small amount of benzoyl peroxide with an aqueous solution of a partially saponified polyvinyl acetate, having a saponification number of 40 to 130 and a viscosity in a 4% aqueous solution at 20° C. of approximately 20 centipoises and effecting polymerization of the monomer sufficient of the partially saponified polyvinyl acetate being employed to maintain the polymerized butyl methacrylate in suspension, the amount employed being not less than 0.75% of the weight of the dispersion.

6. A stable aqueous dispersion of a polymerized alkyl methacrylate which contains as the dispersing agent not less than about 0.75% of a partially saponified polyvinyl acetate having a saponification number of 40 to 130 and a viscosity in a 4% aqueous solution at 20° C. of 10 to 30 centipoises.

7. A stable aqueous dispersion of a polymerized methyl methacrylate which contains as the dispersing agent not less than about 0.75% of a partially saponified polyvinyl acetate having a saponification number of 40 to 130 and a viscosity in a 4% aqueous solution at 20° C. of 10 to 30 centipoises.

8. A stable aqueous dispersion of a polymerized n-butyl methacrylate which contains as the dispersing agent not less than about 0.75% of a partially saponified polyvinyl acetate having a saponification number of 40 to 130 and a viscosity in a 4% aqueous solution at 20° C. of 10 to 30 centipoises.

9. A stable aqueous dispersion of a polymerized isobutyl methacrylate which contains as the dispersing agent not less than about 0.75% of a partially saponified polyvinyl acetate having a saponification number of 40 to 130 and a viscosity in a 4% aqueous solution at 20° C. of 10 to 30 centipoises.

10. A stable aqueous dispersion of a polymerized alkyl methacrylate which contains as the dispersing agent not less than about 0.75% of a partially saponified polyvinyl acetate having a saponification number of 40 to 130 and a viscosity in a 4% aqueous solution at 20° C. of approximately 20 centipoises.

11. A stable aqueous dispersion of a polymerized methyl methacrylate which contains as the dispersing agent not less than about 0.75% of a partially saponified polyvinyl acetate having a saponification number of 40 to 130 and a viscosity in a 4% aqueous solution at 20° C. of approximately 20 centipoises.

12. A stable aqueous dispersion of a polymerized n-butyl methacrylate which contains as the dispersing agent not less than about 0.75% of a partially saponified polyvinyl acetate having a saponification number of 40 to 130 and a viscosity in a 4% aqueous solution at 20° C. of approximately 20 centipoises.

13. A stable aqueous dispersion of a polymerized isobutyl methacrylate which contains as the dispersing agent not less than about 0.75% of a partially saponified polyvinyl acetate having a saponification of 40 to 130 and a viscosity in a 4% aqueous solution at 20° C. of approximately 20 centipoises.

JOSEPH EDWARD SMITH.